May 23, 1933. H. VAN HOOYDONK 1,910,138
REENFORCED PIPE CONSTRUCTION AND METHOD OF SETTING
Filed Dec. 29, 1928 3 Sheets-Sheet 3
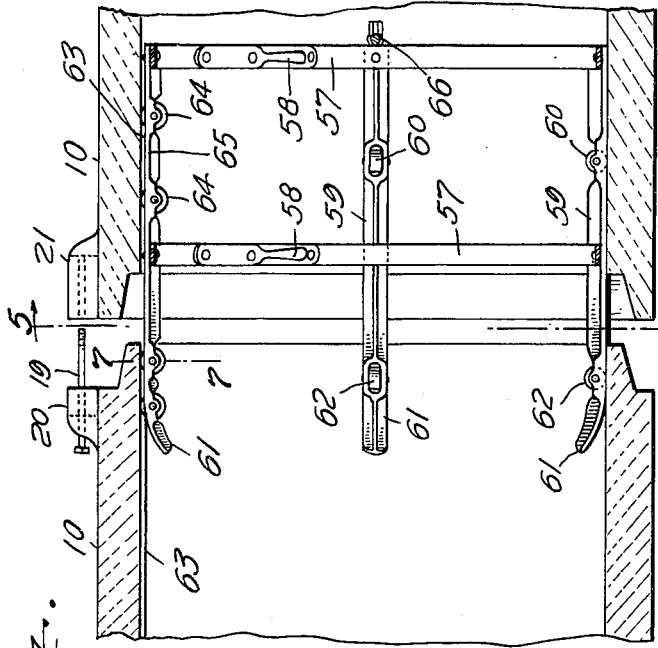
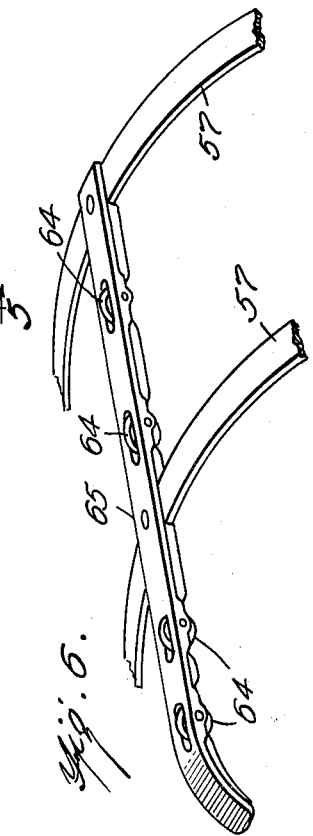
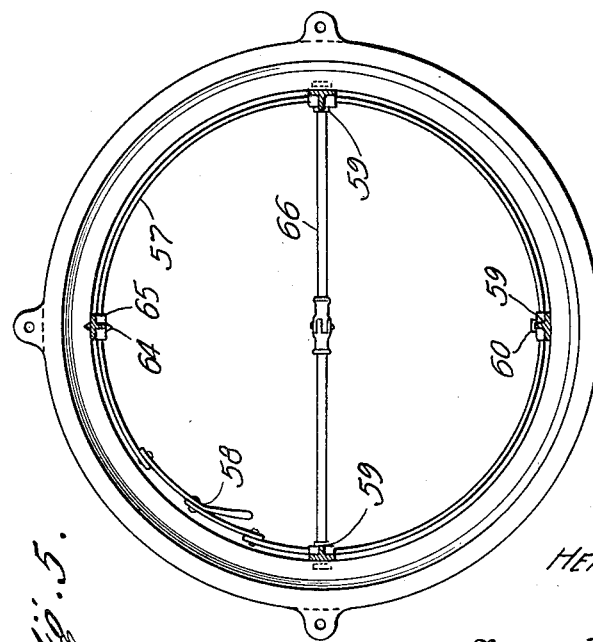
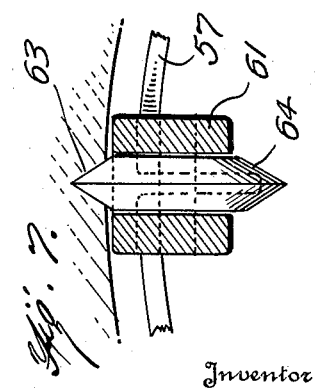
Inventor
HENRY VAN HOOYDONK,
By Townsend & Townsend,
Attorney Patented May 23, 1933

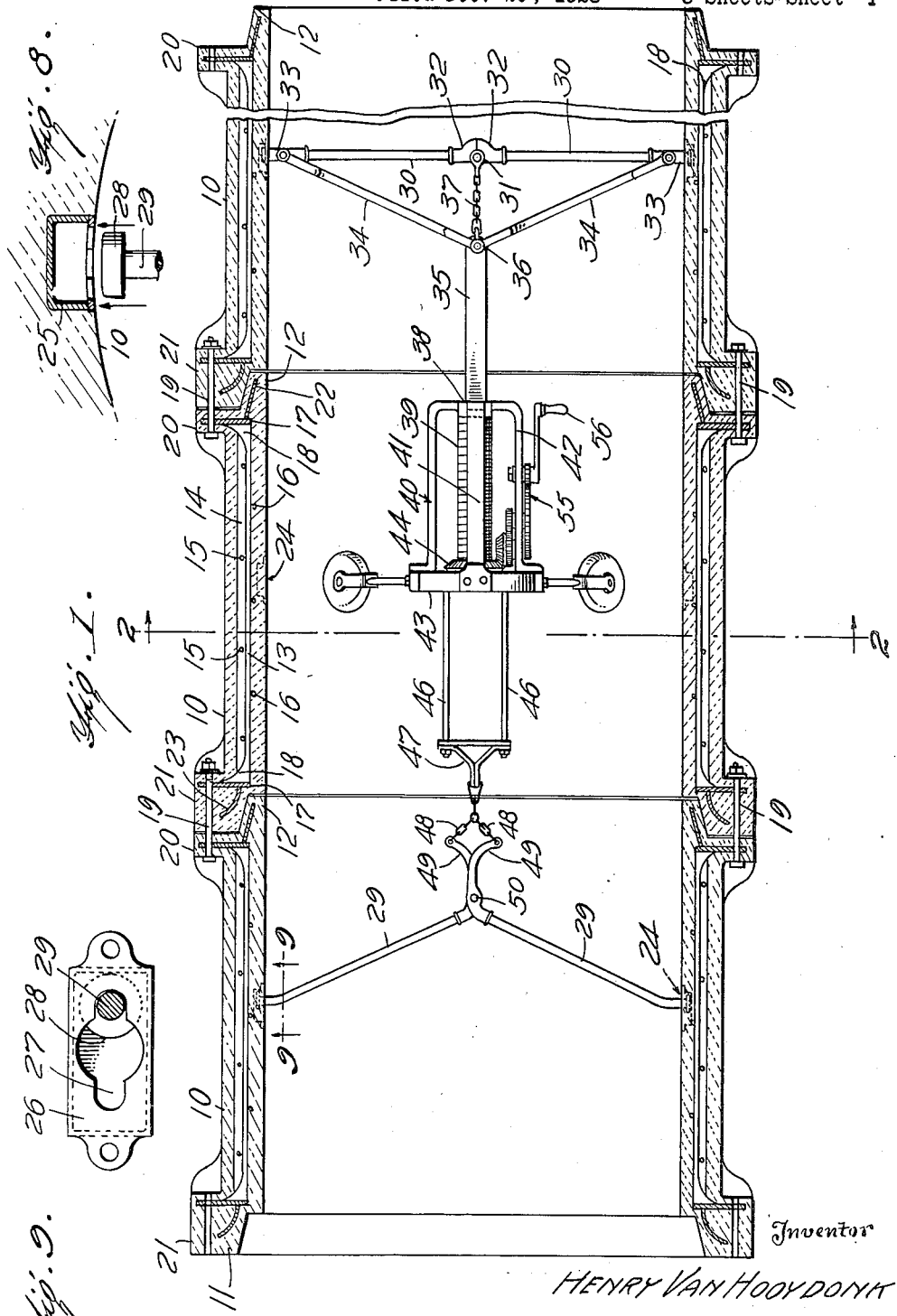

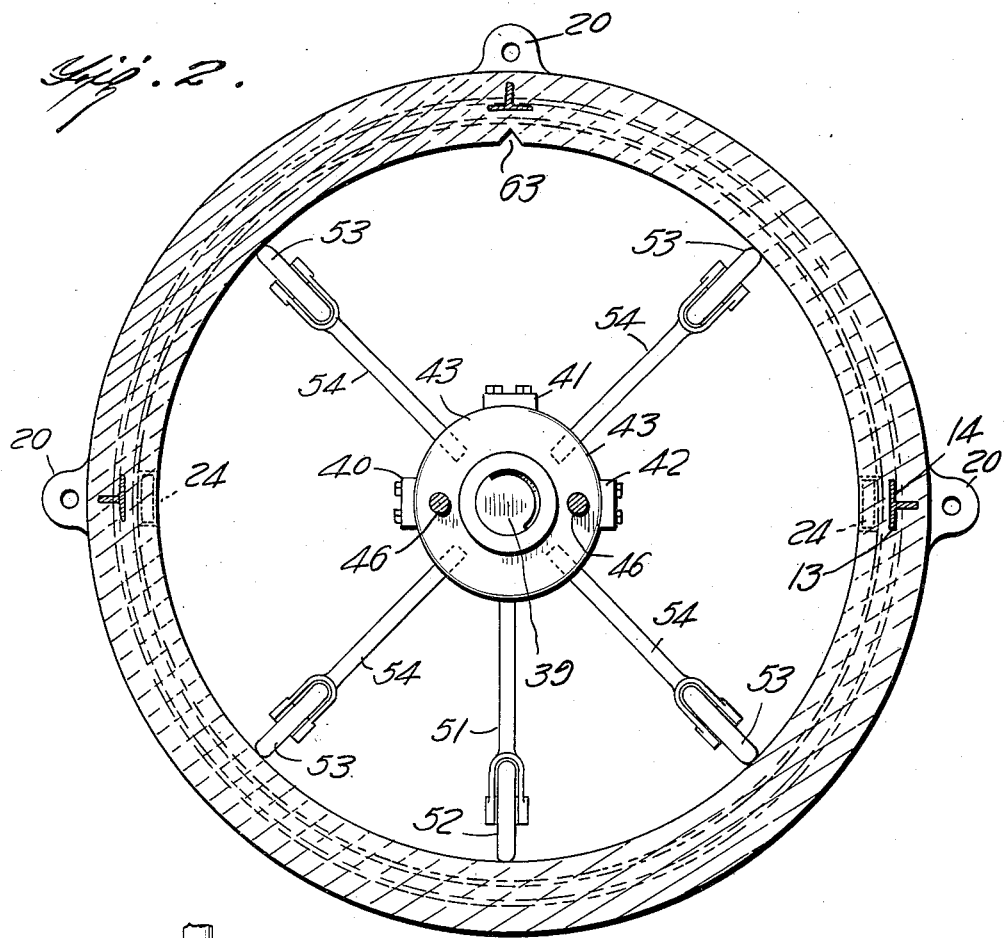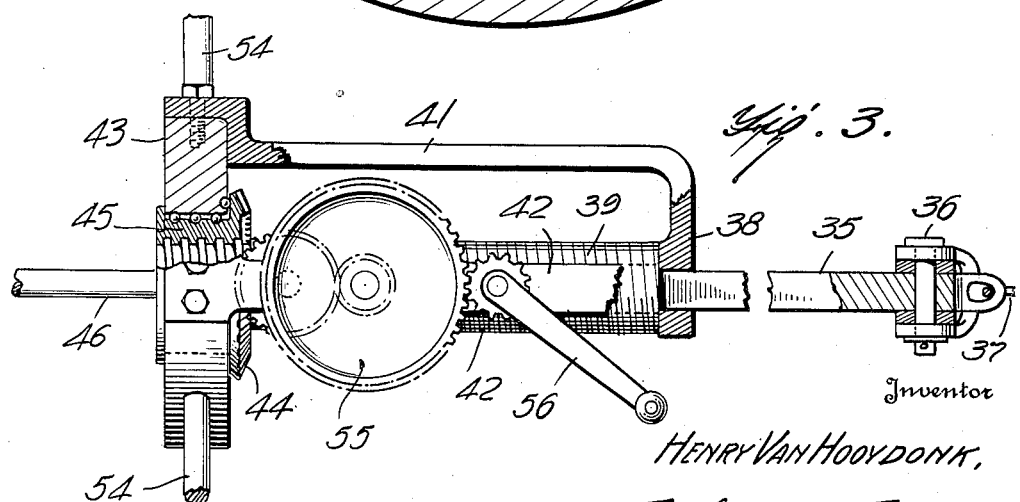

1,910,138

UNITED STATES PATENT OFFICE

HENRY VAN HOOYDONK, OF FORT SMITH, ARKANSAS

REENFORCED PIPE CONSTRUCTION AND METHOD OF SETTING

Application filed December 29, 1928. Serial No. 329,276.

My invention relates to the setting of conduits, pipe lines, culverts and the like, having particular application to conduits of sectional reenforced concrete pipe. It relates also to details of pipe construction and connections.

Heretofore, in the construction of sewers, culverts, and general conduits, engineers have experienced considerable difficulty in the proper setting of relatively large diameter pipe. The structural weight combined with the character of subsoil, such as quicksand and the like, frequently encountered, render the methods heretofore employed costly, cumbersome in operation, and necessitating an inordinate amount of time and labor, and in some instances impossible because of prohibitive cost.

The present invention has been designed to eliminate all of these objectionable features, and to this end it contemplates the provision of a new method of pipe setting as well as pipe construction.

Prior practice has developed pipe setting methods whereby the conventional bell and spigot ends of successive pipe sections are forced into engagement by means operating on the pipe flanges externally of the piping, but such methods have not been utilized with pipes of large diameter, due to space requirements and impracticability of application. It is an object of this invention to provide a method of setting, laying, or connecting pipe sections by forcing their ends together into engagement, through power means, applied and operating entirely within the pipe bore, that is, within an area defined by the bore of the pipe.

Another object of my invention is the provision of a novel method of maintaining a grade in pipe setting operations, without the employment of external grading measures.

A further object is the provision of a novel reinforced concrete pipe construction; a novel manner of connecting sections; and means for effecting the connections.

Another object is the provision of means operating entirely within and upon the pipe bore, for drawing together adjacent ends of sectional piping.

A still further object is the provision of a novel pipe section structure, having means internally thereof adapted for engagement by means or mechanism for moving the section in setting.

Having in view the enumerated objects, as well as all such as will be apparent from the description, the invention resides in the method, construction, combination and arrangement of parts hereinafter described and claimed, and illustrated in the accompanying drawings, wherein is shown a practical, physical embodiment, constituting one form which the invention may take, being the best means which I have thus far devised for carrying into effect the principles of this invention.

Figure 1 is a horizontal section through a connected unit of three pipe sections, as successively secured together in a setting operation, and illustrating in plan, the jack mechanism employed in drawing the sections together. A guide for the pipe ends is indicated as in position to receive a succeeding section.

Figure 2 is a vertical section substantially on the line 2—2 of Figure 1.

Figure 3 is a fragmentary detail, in part elevation, of the jack shown in Figures 1 and 2.

Figure 4 is a vertical section through adjacent unsecured pipe ends as being aligned in setting, illustrating the cooperation of the guide means, shown in elevation.

Figure 5 is a section on line 5—5 of Figure 4.

Figure 6 is a fragmentary perspective of a portion of the guide member.

Figure 7 is a section on line 7—7 of Figure 4.

Figure 8 is a section through a socket member provided in the inner wall of each pipe section, the end of a grapple being shown in elevation prior to engagement in the socket.

Figure 9 is a section on line 9—9 of Figure 1.

As shown in Figure 1, each pipe section 10, which is here indicated as large diameter sewer or water conduit, is formed from a molded plastic setting material body, such as concrete, with a bell flange 11 and a spigot 12 at opposite ends, the spigot end being formed with an inward taper for wedging engagement in the corresponding tapered socket of an adjacent section bell flange.

At a plurality of points, preferably three, with two arranged as a diametrically opposed pair, the body 10 is reenforced by longitudinally extending metal bars 13 embedded therein and terminating just short of the bell flange 11 and spigot 12 at each end. These bars 13 are of T shaped cross-section and are positioned with their shank webs 14 radially outward. A plurality of spaced reenforcing hoop members 15 extend circumferentially in the body 10 passing through apertures provided in the webs 14 for the purpose. Similar reenforcing hoops 16, but of smaller diameter, extend around the body 10 in staggered relation relative to the hoops 15, and bearing against the heads of the T bars 13.

At each end, each of the bars 13 is provided with a foot flange 17 which extends laterally outward beyond the limits defined by the external diameter of the body 10, being reenforced by a web 18 and apertured to receive therethrough a draw bolt 19, four of which bolts are shown in Figure 1. As a reenforcing measure around these foot flanges 17, the material of the pipe body 10 is increased to maintain the overall thickness of the pipe wall, thus forming radial ears 20 and 21 on the respective spigot and bell ends, which ears are socketed from their rear faces to receive and permit access to the heads and securing nuts of the draw bolts 19. Each foot flange 17 at the spigot end carries an extension finger 22 embedded in the spigot 12, and at the bell flange a finger 23 embedded therein, which serve as reenforcing elements.

A most important feature of the invention is the provision, as a permanent structural part of each pipe section, of sockets in the inner wall or face of the section. These sockets are generally indicated as at 24 in Figure 1 and are preferably two in number, being located at diametrically opposed points horizontally of the pipe with respect to its position as set, and substantially midway between the ends. These sockets open flush with the inner wall of the pipe bore, and may be molded, inserted, cut, or otherwise formed or positioned in the pipe. It is to be understood that it is the provision of these sockets which is a principle of the invention, and their specific structure is therefore relatively unimportant. In this embodiment I have shown these sockets as consisting of box-like inserts 25, Figures 8 and 9, embedded in the wall of the pipe body 10 and having each a face plate 26 provided with a key-hole slot 27, through the enlargement of which is adapted to be passed the head 28 of a grapple shank 29, for engagement in the socket behind the face plate. The face plates 26 are arranged flush with the surface of the pipe bore, so that no internal obstruction is presented therein.

In setting the pipe sections I make use of a pipe jack operating entirely within and upon the interior of the sections. This mechanism, as detailed in Figures 1, 2 and 3, consists of an anchor bar comprising two sections 30, hinged at 31 in a break joint having stop ears 32. The sections 30 are provided at their outer ends with heads 33 similar to the described grapple heads 28, which are adapted to be seated in the sockets 24 of an aproximately end pipe section which is first laid and settled at the desired grade. Adjacent the heads 33 each section 30 has pivotally secured thereto a link 34, both of which rods have a common pivotal connection at their opposite ends with one end of a squared shaft 35, by means of a pintle 36 from which a safety chain 37 extends to the break joint hinge 31 of the anchor bar.

The square shaft 35 extends through a squared bearing in a cross-head 38 which, in the position of parts as shown in Figure 1, abuts one end of an externally threaded enlargement 39 of the shaft 35. From the cross-head 38 extend three arms 40, 41 and 42 in mutually spaced parallel relation with respect to each other and to the shaft portion 39 which is caged between said arms. The free ends of these three arms are rigidly secured to a hub plate 43 which provides a bearing for a rotary pinion 44 having its hub 45 threaded over the threaded portion 39 of shaft 35 whereby to function as a travelling nut.

The hub plate 43 has rigidly secured thereto the ends of parallel rods 46 spaced apart a distance sufficient to accommodate therebetween the shaft portion 39. The opposite ends of the rods 46 are secured to a yoke 47 having a chain link connection 48 with the inner curved ends 49 of grapple shanks 29 previously described. The two grapple members have a common pivotal connection as at 50 in the convential manner of such devices so that when a pull is imparted to the chains 48 the members 49 will be drawn together to expand the heads 28 of the shanks 29 apart, as will be readily understood. Extending from beneath the cross-head 38 is an arm 51 carrying at its end a wheel 52 which bears upon the inner wall of a pipe section cooperating with the bearing wheels 53 carried by the ends of radial arms 54 attached to the hub plate 43. All of the wheels 52 and 53 have a bearing upon the inner wall of the pipe sections giving a five point bearing which centers the jack mechanism within the pipe line bore. Driving power is imparted to the rotary pinion 44 through a gear train generally indicated as at 55 mounted upon the arm 42 and actuated through means of a handle lever 56 which, when rotated in a counter closk-wise direction, effects rotation of the pinion 44 to draw the entire assembly comprising the cross-head 38, arms 40, 41 and 42, hub plate 43, rods 46, and yoke 47, along the squared portion of the shaft 45, which shaft has its end anchored by reason of its previously described connection with the link rods 34 extending from the sections 30 of the anchor bar.

In assembling the pipe sections after the first sections have been laid and connected, the jack mechanism is assembled in position and the heads 28 of the grapple arms 29 are inserted through the end of a pipe section which is to be connected in the line after the same has been lowered and guided into position through means to be described. The grapple heads are positioned in the sockets 24 of the pipe section and it will be readily apparent that with the grapple thus engaged in the section, the application of power to the jack mechanism as described results in a forcible drawing in of the pipe section which is to be positioned so that its spigot 12 is drawn forcibly into engagement in the bell flange 13 of the previously secured pipe section within which the jack mechanism is operating. When the sections have thus been securely forced into engagement by the pulling action of the jack and grapple, the draw bolts 19 are applied and fastened to secure the joint.

Due to the fact that pipe sections of this nature are massive affairs it is a matter of considerable time and trouble under conventional practice to secure the alignment of pipe sections in the setting operation. I have eliminated this difficulty by the provision of an internal guide member illustrated in Figures 4, 5, 6 and 7. As shown, this guide member consists of a pair of spaced parallel heavy metal rings 57 provided with break joint levers 58 whereby the set up of the guide may be broken for a dismantling and moving the same from place to place.

In their fully expanded position as illustrated in Figure 4, these rings 57 are of a diameter corresponding to the bore of the pipe section in which the guide is positioned and they are connected by a plurality of arms 59, preferably four in number, which are arranged in parallel relation at equidistantly spaced points circumferentially of the rings and are rigidly secured thereto. These arms 59 extend longitudinally of the pipe sections and are provided between the rings 57 with rollers 60 which have a bearing upon the inner wall of the pipe section permitting ease of longitudinal movement of the guide member within the pipe bore.

Each of the arms 59 has its outer end formed as an inturned finger 61 and adjacent the point of curvature, the fingers 61 are provided with rollers 62 which function similarly to the rollers 60 to effect a rolling bearing with the adjacent pipe sections. At this point it should be noted that each pipe section is formed with a longitudinal groove 63 running the full length of the bore thereof and disposed midway between the sockets 24 to define the top of the pipe with respect to its position when set. As a means of centering the pipe sections and the guide member relative thereto, one of the guide arms 59 has its respective rollers formed with a V-shaped periphery 64 as shown in Figure 7 which is adapted to seat in the groove 63 of the pipe sections. The structural arrangement of this top arm of the guide member, designated for clearness of detail as 65, is best illustrated in Figure 6.

In assembling the pipe sections the guide member is set up within a previously secured section as shown at the right of Figure 4 with its internal guide pulley 64 engaged in the groove 63 at the topmost point of the pipe section. The guide is anchored against rearward movement in the pipe section by means of an anchor bar 66 similar in construction in its general details to the anchor bar previously described in connection with the jack mechanism. In this position the guide fingers 61 extend considerably beyond the end of the pipe section and a section which is to be secured thereto, as shown at the left of Figure 4, can then be lowered into position and slid inwardly over the fingers 61 and the rollers carried thereby, being centered and properly aligned when the groove 63 receives the roller 64 of the guide finger. When this alignment of the sections has been accomplished and the section end is positioned upon the guide, the grapple of the jack mechanism previously described is attached in the sockets of the loose section and power is applied to draw the loose section inwardly into forcible engagement with the previously set section.

Due to the alignment of parts through the cooperation of the guide rollers 64 in the section grooves 63, the attaching ears 20 and 21 on the adjacent section ends will be properly aligned for reception of the drawing bolts 19 whereby the joint may be permanently secured. The guide member is then dismantled by breaking the joints 58 and moved forwardly into its next operative position in the pipe line. The jack mechanism may be correspondingly advanced due to its rolling bearing within the pipe bore and the anchor bar is correspondingly advanced to the next set of sockets in the pipe line, after which the entire operation is repeated in setting a succeeding section.

It will be apparent that due to the cooperation secured between the internal guide and the jack mechanism operating through the grapple in the pipe section sockets, the entire pipe setting operation can be carried out and is so effected, from within the bore of pipe sections previously laid as the line progresses. The only external operations necessary are the lowering of the respective sections and the securing of the draw bolts 19. All details of centering the sections and moving the sections into engagement are accomplished from within the pipe sections by the operation of the jack mechanism and guide means described.

Due to the novel reenforced construction of the pipe sections as embodied herein, it is possible to connect a plurality of sections as a rigid unit so that after the establishment of a grade by the initial setting of a pipe sections, the grade will be maintained automatically by the connection of the succeeding sections without any external support up to the breaking limit of the parts. In practice it is not necessary to undertake external grading measures as in connecting the successive sections the grade is automatically maintained due to the rigid connection between the elements and it only becomes necessary to fill in under the pipe sections as they are laid to eliminate the breaking down of the unit in the event its capacity should be exceeded.

While in this described embodiment of the invention I have illustrated and referred to certain details and materials entering into the construction and operation thereof, I desire it to be understood that the invention is not to be limited thereby, but that any desired modifications and changes may be made in the details as will fall within the scope of the invention as claimed.

I claim:

The method of setting pipe sections of large diameter and which are open from end to end, which consists in providing a pair of portable devices capable of being detachably anchored to the inner surface of said pipe sections and successively shifted from section to section and a pulling jack having means for securing it to each of said devices; laying a section; anchoring the pulling jack therein by one of said devices; laying another section; anchoring it to the device therein; operating the jack to draw one device toward the other and thus drawing together the adjacent section ends; advancing the jack and one device into the last laid section and the other device into a new section; operating the jack; and repeating the process for the next and succeeding sections by moving all implements axially through the sections.

In testimony whereof I affix my signature.

HENRY VAN HOOYDONK.